US012570798B2

(12) United States Patent
Hayano

(10) Patent No.: US 12,570,798 B2
(45) Date of Patent: Mar. 10, 2026

(54) POLYETHER COMPOUND AND GAS SEPARATION MEMBRANE

(71) Applicant: ZEON CORPORATION, Tokyo (JP)

(72) Inventor: Shigetaka Hayano, Tokyo (JP)

(73) Assignee: ZEON CORPORATION, Tokyo (JP)

(*) Notice: Subject to any disclaimer, the term of this patent is extended or adjusted under 35 U.S.C. 154(b) by 628 days.

(21) Appl. No.: 17/278,407

(22) PCT Filed: Sep. 17, 2019

(86) PCT No.: PCT/JP2019/036333
§ 371 (c)(1),
(2) Date: Mar. 22, 2021

(87) PCT Pub. No.: WO2020/066743
PCT Pub. Date: Apr. 2, 2020

(65) Prior Publication Data

US 2021/0355275 A1 Nov. 18, 2021

(30) Foreign Application Priority Data

Sep. 28, 2018 (JP) ................................ 2018-184820

(51) Int. Cl.

| | |
|---|---|
| ***C08G 65/333*** | (2006.01) |
| ***B01D 53/22*** | (2006.01) |
| ***B01D 71/52*** | (2006.01) |
| ***C08G 65/24*** | (2006.01) |
| ***C08J 5/22*** | (2006.01) |

(52) U.S. Cl.
CPC ......... *C08G 65/333* (2013.01); *B01D 53/228* (2013.01); *B01D 71/521* (2022.08); *C08G 65/24* (2013.01); *C08J 5/2256* (2013.01); *C08J 2371/03* (2013.01)

(58) Field of Classification Search
CPC ...... C08G 65/333; C08G 65/24; C08G 65/26; C08G 65/223; C08G 226/135; C08G 65/33; C08G 65/2615; C08G 65/2639; C08G 65/2618; B01D 71/521; B01D 53/228; C08J 5/2256; C08J 2371/03
See application file for complete search history.

(56) References Cited

U.S. PATENT DOCUMENTS

| | | | | |
|---|---|---|---|---|
| 4,937,361 | A | 6/1990 | Wagner et al. | |
| 2003/0208014 | A1 * | 11/2003 | Kerres | B01D 69/02 526/278 |
| 2005/0267287 | A1 | 12/2005 | Adkins | |
| 2015/0270572 | A1 * | 9/2015 | Hayano | H01M 50/491 525/403 |
| 2019/0177477 | A1 | 6/2019 | Ota et al. | |

FOREIGN PATENT DOCUMENTS

| | | | | |
|---|---|---|---|---|
| CN | 104662067 | A | | 5/2015 |
| JP | S4627534 | B1 | | 8/1971 |
| JP | S5033271 | A | | 3/1975 |
| JP | S5169434 | A | | 6/1976 |
| JP | S5242481 | A | | 4/1977 |
| JP | H02202917 | A | | 8/1990 |
| JP | H05105800 | A | | 4/1993 |
| JP | 2010053217 | A | | 3/2010 |
| JP | 2017043704 | A | * | 3/2017 |
| JP | 2018006290 | A | | 1/2018 |
| WO | 2018038202 | A1 | | 3/2018 |

OTHER PUBLICATIONS

Machine Translation of Jp 2017043704A by Ikeda (Year: 2017).*
Gervais, M. et al. "Linear High Molar Mass Polyglycidol and its Direct a-Azido Functionalization" Macromol. Symp. 2011, 308, 101-111. (Year: 2011).*
Wang, S. et al. "Advances in high permeability polymer-based membrane materials for CO2 separations" Energy Environ. Sci., 2016, 9, 1863 (Year: 2016).*
Wei, R-J. et al. Regio-selective synthesis of polyepichlorohydrin diol using Zn—Co(III) double metal cyanide complex. RSC Adv., 2014, 4, 21765 (Year: 2014).*
Gervais, M. et al. Direct Synthesis of alpha-Azido, w-hydroxypolyethers by Monomer-Activated Anionic Polymerization. Macromolecules 2009, 42, 2395-2400 (Year: 2009).*
May 19, 2022, the Extended European Search Report issued by the European Patent Office in the corresponding European Patent Application No. 19865082.2.
Mar. 23, 2021, International Preliminary Report on Patentability issued in the International Patent Application No. PCT/JP2019/036333.
Dec. 10, 2019, International Search Report issued in the International Patent Application No. PCT/JP2019/036333.
Jul. 31, 2024, Communication pursuant to Article 94(3) EPC issued by the European Patent Office in the corresponding European Patent Application No. 19865082.2.

* cited by examiner

*Primary Examiner* — Christina H.W. Rosebach
(74) *Attorney, Agent, or Firm* — KENJA IP LAW PC

(57) ABSTRACT

A polyether compound having a cationic group and two or more chain end groups and, wherein all of the chain end groups are any of a hydroxyl group and an azide group is provided.

5 Claims, No Drawings

POLYETHER COMPOUND AND GAS SEPARATION MEMBRANE

TECHNICAL FIELD

The present invention relates to a polyether compound and a gas separation membrane.

BACKGROUND ART

Since a polyether compound having a cationic group has ionic conductivity, it is known to be used as an electrolyte for imparting ionic conductivity between electrodes in electrochemical devices such as secondary batteries, fuel cells, dye-sensitized solar cells, actuators, and the like.

An ion conductive film formed from a polyether compound having a cationic group may be inferior in shape stability under normal use environment. Therefore, Patent Document 1 proposes, as an ion conductive composition capable of giving an ion conductive film excellent in shape retaining property, the ion conductive composition containing an alkali metal salt in a proportion of 3 parts by weight or more with respect to 100 parts by weight of a polyether compound having a cationic group.

Here, as a method for producing a polyether compound having a cationic group, as described in Patent Document 1, a method is known where a base polymer (a polyether compound having no cationic group) is obtained by the following method (A) or (B), then an amine compound such as an imidazole compound is reacted with the obtained base polymer so that a halogen group constituting an epihalohydrin monomer unit of the base polymer is converted into an onium halide group, and further, if necessary, a halide ion constituting the onium halide group is subjected to an anion exchange reaction.

(A) A method for obtaining a base polymer by ring-opening polymerization of a monomer containing an oxirane monomer containing at least an epihalohydrin such as epichlorohydrin, epibromohydrin, and epiiodohydrin in the presence of a catalyst comprising an onium salt of a compound containing an atom of Group 15 or 16 of the Periodic Table and a trialkylaluminum in which all of the alkyl groups contained are linear alkyl groups, which is disclosed in Patent Document 2.

(B) A method for obtaining a base polymer by ring-opening polymerization of a monomer containing an oxirane monomer containing at least an epihalohydrin such as epichlorohydrin, epibromohydrin, and epiiodohydrin in the presence of a catalyst obtained by reacting triisobutylaluminum with phosphoric acid and triethylamine, which is disclosed in Patent Document 3.

RELATED ART

Patent Documents

Patent Document 1: JP-A-2018-6290
Patent Document 2: JP-A-2010-53217
Patent Document 3: JP-B-46-27534

SUMMARY OF THE INVENTION

Problem to be Solved by the Invention

However, in these production methods, since an end group derived from a catalyst is introduced at one end of the compound and an end group derived from a polymerization terminator is introduced at the other end of the compound, there has been a problem that there is a restriction on the type of the end group to be introduced, or it is difficult to introduce the same kind of end group at both ends.

It is an object of the present invention to provide a polyether compound which can be fixed to another polymer by reacting a polymer main chain end with a functional group of this other polymer.

Means for Solving the Problem

The present inventor has attempted to prepare a gas separation membrane using a polyether compound having a cationic group. However, it has been found that a film obtained from a polyether compound having a cationic group cannot necessarily be said to be excellent in shape retention, and it is not easy to utilize itself as a gas separation membrane. Accordingly, as a result of extensive studies, the present inventor has attempted to solve the problem that the shape retention is inferior by fixing a polyether compound having a cationic group on another polymer and using it. However, in the conventional polyether compound having a cationic group, since it was not easy to fix it to other polymers, it was decided to be complete a polyether compound having a cationic group having a novel structure. The present invention is an invention completed as a result of such investigation.

That is, according to the present invention, there is provided a polyether compound having a cationic group and two or more chain end groups (polymer main chain end groups), wherein all of the chain end groups are any of a hydroxyl group and an azide group.

In the polyether compound according to the present invention, it is preferable that all of the chain end groups are hydroxyl groups or all of the chain end groups are azide groups.

The polyether compound according to the present invention may be one containing a linking group derived from a polyfunctional compound in a polymer main chain.

The polyether compound according to the present invention preferably contains an oxirane monomer unit having a cationic group.

The polyether compound according to the present invention is preferably composed of a monomer unit represented by the following general formula (1):

(1)

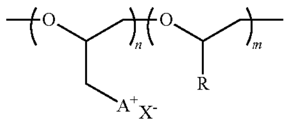

wherein, in the above formula (1), $A^+$ represents a cationic group or a cationic group-containing group, $X^-$ represents any counter anion, R represents a non-ionic group, "n" is an integer of 1 or more, and "m" is an integer of 0 or more.

Further, according to the present invention, there is provided a gas separation membrane comprising the above polyether compound.

Effects of Invention

According to the present invention, there is provided a polyether compound which can be fixed to another polymer by reacting a polymer main chain end with a functional group of this other polymer.

DESCRIPTION OF EMBODIMENTS

<Polyether Compound>

The polyether compound according to the present invention has a cationic group and two or more chain end groups (polymer main chain end groups), and all of the chain end groups are any of a hydroxyl group and an azide group.

The polyether compound according to the present invention is preferably a polyether compound comprising an oxirane monomer unit, which is a unit obtained by ring-opening polymerization of an oxirane structural portion of a compound containing an oxirane structure, and has a cationic group in its molecular.

Specific examples of the oxirane monomer unit forming the polyether compound having a cationic group according to the present invention include an alkylene oxide monomer unit such as an ethylene oxide unit, a propylene oxide unit, and 1,2-butylene oxide unit; an epihalohydrin monomer unit such as an epichlorohydrin unit, an epibromohydrin unit, and an epiiodohydrin unit; an alkenyl group-containing oxirane monomer unit such as an allyl glycidyl ether unit; an aromatic ether group-containing oxirane monomer unit such as a phenyl glycidyl ether unit; a (meth)acryloyl group-containing oxirane monomer unit such as a glycidyl acrylate unit and a glycidyl methacrylate unit; and the like. However, the oxirane monomer unit is not limited to these examples.

The polyether compound having a cationic group according to the present invention may contain two or more oxirane monomer units. In this case, the distribution pattern of the plurality of repeating units is not particularly limited and is preferably a random distribution.

Among the above-mentioned monomer units, the epihalohydrin monomer unit, the alkenyl group-containing oxirane monomer unit, and the (meth)acryloyl group-containing oxirane monomer unit are oxirane monomer units having a cross-linkable group. Including such an oxirane monomer unit having a cross-linkable group enables a cross-linkable group in addition to a cationic group to be introduced into the polyether compound having a cationic group according to the present invention to make the polyether compound having a cationic group cross-linkable. In particular, when the polyether compound having a cationic group according to the present invention has a cross-linkable group, by blending a cross-linking agent, a cross-linkable composition can be prepared. The cross-linked product obtained by cross-linking this cross-linkable composition includes a cross-linked structure, and hence for example when molded into a predetermined shape, the cross-linked product has better shape retention. The oxirane monomer unit having a cross-linkable group may be any monomer unit having a cross-linkable group, and is not particularly limited to those described above. In addition, in the oxirane monomer unit composing the polyether compound having a cationic group, the cationic group and the cross-linkable group may be included as the same repeating unit or as separate repeating units. However, it is preferable for those units to be included as separate repeating units.

A proportion of oxirane monomer units having a cross-linkable group in the polyether compound having a cationic group according to the present invention is not limited to a particular proportion. However, the proportion is preferably 99 mol % or less, more preferably 50 mol % or less, and even more preferably 20 mol % or less, based on all the oxirane monomer units composing the polyether compound having a cationic group. A lower limit of the proportion of the oxirane monomer units having a cross-linkable group is not limited to a particular value. However, from the perspective of producing a cross-linkable composition capable of cross-linking the polyether compound according to the present invention and enabling a cross-linked product obtained by cross-linking such cross-linkable composition to exhibit even better shape retention, the proportion is preferably 1 mol % or more.

Further, the polyether compound having a cationic group according to the present invention contains an oxirane monomer unit having a cationic group as at least a part of the oxirane monomer units. In other words, in the polyether compound according to the present invention, the cationic group is a hanging group which is not bonded to the polymer main chain end and is bonded so as to hang from the polymer main chain in the oxirane monomer unit constituting the polymer main chain.

The cationic group which can be included in the polyether compound having a cationic group according to the present invention is not limited to a particular cationic group. However, from the viewpoint of gas separation performance, the cationic group is preferably a cationic group in which atoms from group 15 or 16 of the periodic table have formed an onium cation structure, more preferably a cationic group in which nitrogen atoms have formed an onium cation structure, further preferably a cationic group in which nitrogen atoms in a nitrogen atom-containing aromatic heterocycle have formed an onium cation structure, particularly preferably a cationic group in which nitrogen atoms in an imidazolium ring have formed an onium cation structure.

Specific examples of the cationic group include an ammonium group such as an ammonium group, a methylammonium group, a butylammonium group, a cyclohexyl ammonium group, an anilinium group, a benzylammonium group, an ethanolammonium group, a dimethylammonium group, a diethylammonium group, a dibutylammonium group, a nonylphenylammonium group, a trimethylammonium group, a triethylammonium group, a n-butyldimethylammonium group, a n-octyldimethylammonium group, a n-stearyldimethylammonium group, a tributylammonium group, a trivinylammonium group, a triethanolammonium group, an N,N-dimethylethanolammonium group, and a tri (2-ethoxyethyl) ammonium group; a group including a heterocyclic ring having a cationic nitrogen atom such as a piperidinium group, a 1-pyrrolidinium group, a 1-methylpyrrolidinium group, an imidazolium group, a 1-methylimidazolium group, a 1-ethylimidazolium group, an n-butylimidazolium group, a benzimidazolium group, a pyrrolium group, a 1-methylpyrrolium group, an oxazolium group, a benzoxazolium group, a benzisoxazolium group, a pyrazolium group, an isoxazolium group, a pyridinium group, a 2,6-dimethylpyridinium group, a pyrazinium group, a pyrimidinium group, a pyridazinium group, a triazinium group, an N,N-dimethylanilinium group, a quinolinium group, an isoquinolinium group, an indolinium group, an isoindolium group, a quinoxalinium group, an isoquinoxalinium group, and a thiazolium group; a group including a cationic phosphorus atom such as a triphenylphosphonium salt and a tributylphosphonium group; and the like. However, it is not limited to these examples. Among these examples, a group including a heterocyclic ring having a cationic nitrogen atom such as a 1-methylpyrrolidinium group, an imidazolium group, a 1-methylimidazolium group, a 1-ethylimidazolium group, an n-butylimidazolium group and a benzimidazolium group is preferred.

Although the cationic group generally has a counter anion, the counter anion is not limited to a particular one and examples thereof include a halide ion such as $Cl^-$, $Br^-$, and $I^-$, a sulfonylimide ion such as $(FSO_2)_2N^-$, $(CF_3SO_2)_2N^-$, and $(CF_3CF_2SO_2)_2N^-$, and further, $OH^-$, $SCN^-$, $BF_4^-$, $PF_6^-$, $ClO_4^-$, $CH_3SO_3^-$, $CF_3SO_3^-$, $CF_3COO^-$, $PhCOO^-$, $CH_3COO^-$, $(NC)_2N^-$, $B(CN)_4^-$ and the like. These counter anions may be appropriately selected according to properties of the polyether compound to be obtained.

In the polyether compound having a cationic group according to the present invention, among the oxirane monomer units composing the polyether compound, at least a part of the oxirane monomer units may be an oxirane monomer unit having a cationic group and, for example, the oxirane monomer units composing the polyether compound may all have a cationic group or may be a mixture of the oxirane monomer units having a cationic group and the oxirane monomer units not having a cationic group. In the polyether compound having a cationic group according to the present invention, a proportion of oxirane monomer units having a cationic group is not limited to a particular proportion. However, the proportion is preferably 1 mol % or more, more preferably 10 mol % or more, and even more preferably 20 mol % or more, based on all the oxirane monomer units composing the polyether compound having a cationic group. Setting the proportion of the oxirane monomer units having a cationic group to be within the above-mentioned range enables gas separation performance even better. An upper limit of the proportion of the oxirane monomer units having a cationic group is not limited to a particular value. However, from the perspective of enabling the polyether compound according to the present invention being a cross-linkable composition capable of cross-linking and enabling a cross-linked product obtained by cross-linking such cross-linkable composition to exhibit even better shape retention, the proportion is preferably 99 mol % or less.

The structure of the polyether compound having a cationic group according to the present invention is not limited to a particular structure. However, a structure composed of a monomer unit represented by the following general formula (1) is preferred.

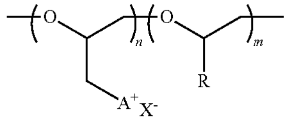
(1)

In the above general formula (1), $A^+$ represents a cationic group or a cationic group-containing group, $X^-$ represents any counter anion, R represents a non-ionic group, "n" is an integer of 1 or more, and "m" is an integer of 0 or more.

In the above general formula (1), $A^+$ represents a cationic group or a cationic group-containing group. Specific examples of the cationic group are as described above, and specific examples of the cationic group-containing group include a group containing the cationic group as described above.

In the above general formula (1), $X^-$ represents any counter anion. Specific examples of the counter anion are as described above.

In the above general formula (1), R represents a non-ionic group. R is not particularly limited as long as it is a non-ionic group, and it may include a cross-linkable group. Examples of R include a hydrogen atom; an alkyl group having 1 to 10 carbon atoms such as a methyl group, an ethyl group, a n-propyl group, an isopropyl group, a n-butyl group, an isobutyl group, and a t-butyl group; an alkenyl group having 2 to 10 carbon atoms such as a vinyl group, an allyl group, and a propenyl group; an alkynyl group having 2 to 10 carbon atoms such as an ethynyl group and a propynyl group; a cycloalkyl group having 3 to 20 carbon atoms such as a cyclopropyl group, a cyclobutyl group, a cyclopentyl group, and a cyclohexyl group; an aryl group having 6 to 20 carbon atoms such as a phenyl group, a 1-naphthyl group, and a 2-naphthyl group; and the like. Among these examples, an alkyl group having 1 to 10 carbon atoms, an alkenyl group having 2 to 10 carbon atoms, an alkynyl group having 2 to 10 carbon atoms, a cycloalkyl group having 3 to 20 carbon atoms, and an aryl group having 6 to 20 carbon atoms may have a substituent at any position. Examples of the substituent include an alkyl group having 1 to 6 carbon atoms such as a methyl group and an ethyl group; an alkoxy group having 1 to 6 carbon atoms such as a methoxy group, an ethoxy group, and an isopropoxy group; an alkenyloxy group having 2 to 6 carbon atoms such as a vinyloxy group and an allyloxy group; an aryl group which may have a substituent such as a phenyl group, a 4-methylphenyl group, a 2-chlorophenyl group, and a 3-methoxyphenyl group; a halogen atom such as a fluorine atom, a chlorine atom, and a bromine atom; an alkylcarbonyl group having 1 to 6 carbon atoms such as a methylcarbonyl group and an ethylcarbonyl group; a (meth)acryloyloxy group such as an acryloyloxy group and a methacryloyloxy group; and the like.

In the above general formula (1), "n" may be an integer of 1 or more, and "m" may be an integer of 0 or more. However, "n" is preferably an integer of 1 to 100,000, more preferably an integer of 2 to 50,000, even more preferably an integer of 5 to 5,000, and particularly preferably an integer of 5 to 900. Further, "m" is preferably an integer of 0 to 100,000, more preferably an integer of 2 to 50,000, even more preferably an integer of 5 to 5,000, and particularly preferably an integer of 5 to 100. In addition, n+m is preferably an integer of 1 to 200,000, more preferably an integer of 4 to 100,000, even more preferably an integer of 10 to 10,000, and particularly preferably an integer of 10 to 1,000.

The number average molecular weight (Mn) of the polyether compound having a cationic group according to the present invention is not particularly limited, but is preferably 750 to 2,000,000, more preferably 1000 to 1,000,000, and more preferably 1500 to 500,000. The molecular weight distribution (Mw/Mw) of the polyether compound having a cationic group according to the present invention is preferably 1.0 to 3.0, and more preferably 1.0 to 2.0. The number average molecular weight and the molecular weight distribution of the polyether compound having a cationic group can be determined by the methods described in EXAMPLES below. It is also noted that the molecular weight distribution of the polyether compound having a cationic group can be considered as being a value that has not changed from the molecular weight distribution of the base polymer (polyether compound not having a cationic group) before the introduction of a cationic group.

The chain structure of the polyether compound having a cationic group according to the present invention is not particularly limited, and may be a straight chain or a chain structure having a branch such as a graft chain and a radial chain.

In addition to the cationic group described above, the polyether compound according to the present invention has two or more chain end groups, and all of the chain end groups are any of a hydroxyl group and an azide group.

In the present invention, the polymer main chain means a molecular chain containing two or more ether bonds (—C—O—C—), and preferably means a molecular chain formed by linking two or more oxirane monomer units. In addition, the polymer main chain end group means a group bonded to the terminal of the polymer main chain.

As the number of the chain end groups of the polyether compound, it is preferably 2 to 10, more preferably 2 to 4, per one molecule of the polyether compound from the viewpoint of being able to be firmly fixed by the other polymer. Further, it is also one of the preferred embodiments that the polyether compound has two chain end groups and is composed of a single molecular chain in which the polyether compound is not branched.

Preferably, the polyether compound according to the present invention is any one in which all of the chain end groups are hydroxyl groups or all of the chain end groups are azide groups. By setting all of the chain end groups to either hydroxyl groups or azide groups alone, fixation to the other polymer using these end groups can proceed more smoothly.

The polyether compound according to the present invention may contain a linking group derived from a polyfunctional compound in the polymer main chain. In other words, it is preferable that the polyether compound according to the present invention has a structure in which two or more polymer chains formed by an oxirane monomer unit are bonded to each other via a linking group derived from a polyfunctional compound.

The valence of the linking group is not particularly limited as long as it is 2 or more, but is preferably 2 to 8, and more preferably 2 to 4. It is also one of the preferred embodiments that the valence of the linking group is divalent.

The polyfunctional compound is not particularly limited as long as it is a compound having two or more functional groups. The functional group contained in the polyfunctional compound includes, for example, an alkynyl group, an isocyanate group, an acid halide group, a carboxyl group, a halogenosilyl group, and an epoxy group.

As the polyfunctional compound, dialkyne compounds such as 1,9-decadiyne, 1,8-nonadiyne, 1,7-octadiyne, 1,6-heptadiyne, 1,5-hexadiyne, 2,4-hexadiyne, 2,6-octadiyne, and 3,5-octadiyne;

polyvalent isocyanate compounds such as hexamethylene diisocyanate, 2,2,4-trimethylhexane diisocyanate, 1,4-cyclohexane diisocyanate, methylcyclohexylene diisocyanate, trilene diisocyanate, 4,4'-diphenylmethane diisocyanate, xylylene diisocyanate;

polyvalent carboxylic acid halide compounds such as adipic acid dichloride, phthalic acid dichloride, and benzene-1,2,5-tricarboxylic acid trichloride;

polyvalent carboxylic acid compounds such as succinic acid, glutaric acid, adipic acid, pimelic acid, fumaric acid, phthalic acid, and trimellitic acid;

dihalogenated silicon compounds such as dimethyldichlorosilane, diphenyldichlorosilane, dihexyldichlorosilane, dioctyldichlorosilane, dibutyldichlorosilane, and methyldichlorosilane;

trihalogenated silicon compounds such as phenyltrichlorosilane, hexyltrichlorosilane, octyltrichlorosilane, and butyltrichlorosilane, methyltrichlorosilane;

tetrahalogenated silicon compounds such as tetrachlorosilane;

polyvalent epoxy compounds such as 1,2,7,8-diepoxyoctane, 1,2,3,4-diepoxybutane, 1,2,4,5-diepoxypentane, and 1,2,5,6-diepoxyhexane; and the like may be mentioned.

When all of the polymer end groups are azide groups, they may have a linking group derived from the polyvalent isocyanate compound, the polyvalent carboxylic acid halide compound, the polyvalent carboxylic acid compound, the dihalogenated silicon compound, the trihalogenated silicon compound, or the tetrahalogenated halide compound.

When all of the polymer end groups are hydroxyl groups, they may have a linking group derived from the dialkyne compound.

The linking group may be constituted by only one molecule of the polyfunctional compound, but may be constituted by polymerizing or bonding a large number of the polyfunctional compounds. In this case, the polyether compound has a shape in which more than two polymer chains (arms) formed by an oxirane monomer unit are bonded to a plurality of functional groups contained in one linking group (microgels). Such compounds are sometimes referred to as a star polymer. As the polyfunctional compound for forming a microgel, a polyvalent epoxy compound having two or more epoxy groups is preferred.

<Production Method of Polyether Compound>

<First Production Method>

As a method for producing the polyether compound according to the present invention, for example, it may be mentioned a production method (sometimes referred to herein as a "first production method") comprising a polymerization step of obtaining a base polymer by performing a ring-opening polymerization of a monomer containing an oxirane monomer containing at least an epihalohydrin such as epichlorohydrin, epibromohydrin, and epiiodohydrin in the presence of a catalyst comprising a cationic portion containing an atom of Group 15 or 16 of the Periodic Table, and an onium compound having an azide anion, and a trialkylaluminum in which all of the alkyl groups contained are linear alkyl groups; and an onium-forming step of converting a halogen group constituting an epihalohydrin monomer unit of the base polymer into a cationic group by reacting an onium-forming agent to the obtained base polymer.

Polymerization Step in the First Production Method

In the polymerization step of the first production method, the amount of the onium compound to be used may be determined depending on the molecular weight of the target base polymer and the like, and is not particularly limited, but is usually 0.0001 to 50 mol %, preferably 0.0005 to 20 mol %, and particularly preferably 0.001 to 10 mol %, based on the total monomer used.

In the polymerization step of the first production method, as a catalyst, a catalyst comprising an onium compound and trialkylaluminum in which all of the alkyl groups contained are linear alkyl groups is used.

The onium compound used in the polymerization step of the first production method has a cationic portion and an anionic portion, and the cation portion contains an atom of Group 15 or 16 of the Periodic Table, and the anion portion is constituted by an azide anion.

As the cationic portion, ammonium ion (for example, tetraalkylammonium ions such as tetramethylammonium ion and tetrabutylammonium ion), pyridinium ion, imidazolium ion, phosphonium ion, arsonium ion, stibonium ion, oxonium ion, sulfonium ion, selenonium ion, and the like are exemplified, ammonium ion, pyridinium ion, imidazolium ion, phosphonium ion, and sulfonium ion are preferable, ammonium ion, phosphonium ion, and sulfonium ion are more preferable, ammonium ion is furthermore preferable.

As the onium compound, ammonium azide, pyridinium azide, imidazolium azide, phosphonium azide, arsonium azide, stibonium azide, oxonium azide, sulfonium azide, selenonium azide, and the like are exemplified, ammonium azide, pyridinium azide, imidazolium azide, phosphonium azide, and sulfonium azide are preferable, ammonium azide, phosphonium azide, and sulfonium azide are more preferable, ammonium azide is furthermore preferable.

As the onium compound, a compound represented by the following general formula (2) may be mentioned.

(2)

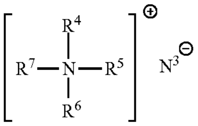

In the general formula (2), each $R^4$ to $R^7$ independently represents an alkyl group having 1 to 20 carbon atoms which may contain a heteroatom or an aryl group which may contain a heteroatom, and any of N represents a nitrogen atom. Also, each $R^4$ to $R^7$ is preferably independently an alkyl group having 1 to 10 carbon atoms which may contain a heteroatom or an aryl group which may contain a heteroatom, and particularly preferably independently a methyl group, an ethyl group, an n-butyl group or an n-octyl group.

Examples of the onium compound include tetramethylammonium azide and tetrabutylammonium azide, and among them, tetrabutylammonium azide is preferred.

As the trialkylaluminum used in the polymerization step of the first production method, trialkylaluminum in which all of the alkyl groups contained are linear alkyl groups is preferred. Examples of the trialkylaluminum include trialkylaluminum represented by the general formula: $R^1R^2R^3Al$.

Each $R^1$ to $R^3$ independently represents a linear alkyl group having 1 to 18 carbons, and Al represents an aluminum atom. Also, each $R^1$ to $R^3$ is preferably independently a linear alkyl group having 1 to 12 carbon atoms, and particularly preferably a linear alkyl group having 1 to 8 carbon atoms (i.e., a methyl group, an ethyl group, an n-propyl group, an n-butyl group, an n-pentyl group, an n-hexyl group, an n-heptyl group, or an no-octyl group). Moreover, it is particularly preferred that all $R^1$ to $R^3$ be the same group.

Examples of the trialkylaluminum include trimethylaluminum, triethylaluminum, and tri-n-octylaminium, and among them, trimethylaluminum and triethylaluminum are preferred.

In the polymerization step of the first production method, the use ratio of the onium compound and the trialkylaluminum is not particularly limited, but the molar ratio of the onium compound trialkylaluminum is preferably in the range of 1:1 to 1:100, more preferably in the range of 1.0:1.1 to 1.0:50.0, and particularly preferably in the range of 1.0:1.2 to 1.0:10.0.

If necessary, other components such as a Lewis base such as N,N,N',N'-tetramethylethylenediamine and a crown ether may be added to a mixture of an onium compound and a trialkylaluminum, which is used as a catalyst.

Although there is no particular limitation on the method of mixing the onium compound with the trialkylaluminum, it is preferable to dissolve or suspend each of them in a solvent and mix them. Although there is no particular limitation on the solvent used, an inert solvent is suitably used, and for example, aromatic hydrocarbons such as benzene, and toluene; chain saturated hydrocarbons such as n-pentane, and n-hexane; alicyclic hydrocarbons such as cyclopentane, and cyclohexane; ethers such as tetrahydrofuran, anisole, and diethyl ether; or a mixed solvent thereof; and the like may be used. Although there is no particular limitation on the temperature and time at which the components constituting the catalyst are mixed, it is preferable to mix them under a condition of −30 to 50° C. for 10 seconds to 30 minutes.

In the polymerization step of the first production method, ring-opening polymerization of a monomer containing an oxirane monomer containing at least an epihalohydrin is performed in the presence of the catalyst composed of the onium compound and the trialkylaluminum obtained as described above. The method of mixing the catalyst and the monomer is not particularly limited, and for example, a monomer may be added to a solvent containing the catalyst, or the catalyst may be added to a solvent containing the monomer. The polymerization method is not particularly limited, but from the viewpoint of favorably controlling polymerization, polymerization is preferably performed by a solution polymerization method. As the solvent, an inert solvent is suitably used, for example, aromatic hydrocarbons such as benzene, and toluene; chain saturated hydrocarbons such as n-pentane, and n-hexane; alicyclic hydrocarbons such as cyclopentane, and cyclohexane; ethers such as tetrahydrofuran, anisole, and diethyl ether; or a mixed solvent thereof; and the like may be used. Among these solvents, a nonpolar solvent is particularly preferably used because the polymerization reaction rate is increased. The amount of the solvent to be used is not particularly limited, but is preferably used so as to have a monomer concentration of 1 to 50% by weight, and particularly preferably 3 to 40% by weight.

In the first production method, the conditions under which the polymerization is performed are not particularly limited, and may be determined according to the type of the monomer or catalyst used, the target molecular weight, and the like. The pressure at the time of polymerization is usually from 1 to 500 atm, preferably from 1 to 100 atm, and particularly preferably from 1 to 50 atm. The temperature at the time of polymerization is usually −70 to 200° C., preferably −40 to 150° C., and particularly preferably −20 to 100° C. The polymerization time is usually 10 seconds to 100 hours, preferably 20 seconds to 80 hours, and particularly preferably 30 seconds to 50 hours.

The monomer may be added in a total amount at one time to the reaction system, or may be added in multiple portions. In the above production method, since the polymerization reaction proceeds with living property, it is also possible to obtain a block copolymer by sequentially adding a different monomer and completing the polymerization reaction every time the monomer is added.

After completion of the polymerization reaction of all monomers, it is preferable to add a polymerization reaction terminator to the reaction system. As the polymerization reaction terminator, for example, water or alcohols can be used. By using such a polymerization reaction terminator and using the catalyst composed of the onium compound in which an anion portion is constituted by an azide anion and the trialkylaluminum, a base polymer composed of at least an epihalohydrin monomer unit having an azide group at the polymerization initiation end and a hydroxyl group at the polymerization termination end can be obtained.

After the polymerization reaction is stopped, the base polymer may be recovered according to a conventional method such as drying under reduced pressure.

Coupling Step in the First Production Method

In the polymerization step of the first production method, the base polymer having an azide group at the polymerization initiation end and a hydroxyl group at the polymerization termination end is obtained.

It is also preferable that the first production method includes a coupling step of reacting the obtained base polymer with a polyfunctional compound after obtaining the base polymer in the polymerization step. By using a production method including the coupling step, a base polymer in which all of the chain end groups are hydroxyl groups or a base polymer in which all of the chain end groups are azide groups can be easily produced.

For example, by reacting the base polymer having an azide group at the polymerization initiation end and a hydroxyl group at the polymerization termination end, which is obtained in the polymerization step, with a dialkyne compound, an azide group having the base polymer at the terminal of the polymer main chain and an alkynyl group possessed by the dialkyne compound react with each other, thereby forming 1,2,3-triazole ring. As a result, it is possible to produce a base polymer in which two polymer chains derived from the base polymers obtained in the polymerization step are bonded to each other via a linking group derived from the dialkyne compound and two polymer main chain end group are hydroxyl groups.

The reaction of the base polymer having an azide group at the polymerization initiation end and a hydroxyl group at the polymerization termination end with the dialkyne compound can proceed in an organic solvent or in water. As the dialkyne compound, the above-described dialkyne compound may be used. Further, by using monovalent copper ions as a catalyst, the reaction rate can be increased. The reaction temperature may be −30 to 100° C., and the reaction time is usually 1 minute to 96 hours.

Further, for example, by reacting the base polymer having an azide group at the polymerization initiation end and a hydroxyl group at the polymerization termination end, which is obtained in the polymerization step, with a halogenated silicon compound having two or more halogenosilyl groups, a hydroxyl group having the base polymer at the terminal of the polymer main chain and a halogenosilyl group having the halogenated silicon compound react with each other, thereby forming a siloxane bond. As a result, it is possible to produce a base polymer in which two or more polymer chains derived from the base polymers obtained in the polymerization step are bonded to each other via a linking group derived from the halogenated silicon compound and all of the chain end groups are azide groups.

The reaction of the base polymer having an azide group at the polymerization initiation end and a hydroxyl group at the polymerization termination end with the halogenated silicon compound can proceed in an organic solvent. As the halogenated silicon compound, the above-described halogenated silicon compound can be used. Further, other polyfunctional compounds other than the halogenated silicon compound, for example, the above-described polyvalent isocyanate compound, polyvalent carboxylic acid chloride compound, polyvalent carboxylic acid compound, and the like, can be used in the same manner as the halogenated silicon compound, and a base polymer in which all of the chain end groups are azide groups can be produced.

By adjusting the number of functional groups possessed by the polyfunctional compound used in the coupling step, it is also possible to adjust the number of polymer end groups possessed by the obtained base polymer. For example, when a dialkyne compound having two alkynyl groups or a halogenated silicon compound having two halogenosilyl groups is used, the number of polymer end groups possessed by the obtained base polymer becomes two.

<Second Production Method>

In addition, as a method for producing a polyether compound according to the present invention, for example, it may be mentioned a production method (sometimes referred to herein as a "second production method") comprising a polymerization step of obtaining a base polymer by polymerizing or bonding a polyfunctional compound in the presence of a catalyst comprising an onium salt of a compound containing an atom of Group 15 or 16 of the Periodic Table and a trialkylaluminum in which all of the alkyl groups contained are linear alkyl groups so as to form a microgel in advance, then by performing a ring-opening polymerization of a monomer containing an oxirane monomer containing at least an epihalohydrin such as epichlorohydrin, epibromohydrin, and epiiodohydrin; and an onium-forming step of converting a halogen group constituting an epihalohydrin monomer unit of the base polymer into a cationic group by reacting an onium-forming agent to the obtained base polymer.

Polymerization Step in the Second Production Method

In the polymerization step in the second production method, a microgel is formed by polymerizing or bonding a polyfunctional compound in advance, and then a monomer containing an oxirane monomer containing at least an epihalohydrin such as epichlorohydrin, epibromohydrin, and epiiodohydrin is ring-opening polymerized. In this case, a star polymer in which more than two polymer chains formed by an oxirane monomer unit are bonded to a plurality of functional groups of one linking group (microgel) can be obtained. At this time, by adjusting the degree of polymerization of the polyfunctional compound, the number of functional groups of the linking group (microgel) can be adjusted, and it is also possible to adjust the number of polymer end groups possessed by the finally obtained base polymer. The number of functional groups (i.e., the degree of branching of the base polymer) of the linking group (microgel) may be 2.1 to 4.0 on average.

Examples of the polyfunctional compound include those described above, and among them, a polyvalent epoxy compound is preferred, and 1,2,7,8-diepoxyoctane, 1,2,3,4-diepoxybutane, 1,2,4,5-diepoxypentane, and 1,2,5,6-diepoxyhexane are more preferred.

For example, when the polyvalent epoxy compound is used as the polyfunctional compound and water or an alcohol is used as the polymerization reaction terminator, it can be obtained a star-shaped base polymer having a linking group derived from the polyvalent epoxy compound, a plurality of polymer chains bonded to the linking group, and a plurality of chain end groups bonded to the terminal of the polymer chain, and in which all of the chain end groups are hydroxyl groups.

In the polymerization step of the second production method, as a catalyst, a catalyst comprising an onium salt of a compound containing an atom of Group 15 or 16 of the Periodic Table and a trialkylaluminum in which all of the alkyl groups contained are linear alkyl groups is used.

As the onium salt, an ammonium salt, a pyridinium salt, an imidazolium salt, a phosphonium salt, an arsonium salt, a stibonium salt, an oxonium salt, a sulfonium salt, and a selenonium salt are exemplified, and an ammonium salt, a pyridinium salt, an imidazolium salt, a phosphonium salt, and a sulfonium salt are preferable, an ammonium salt, a phosphonium salt, and a sulfonium salt are more preferable, and an ammonium salt is more preferable.

Examples of the onium salt used in the polymerization step of the second production method include an ammonium salt represented by the following general formula (3).

(3)

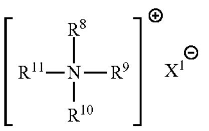

In the general formula (3), each $R^8$ to $R^{11}$ independently represents an alkyl group having 1 to 20 carbon atoms which may contain a heteroatom or an aryl group which may contain a heteroatom, N represents a nitrogen atom, and $X^1$ represents a counter ion composed of an inorganic or organic group. Also, each $R^8$ to $R^{11}$ is preferably independently an alkyl group having 1 to 10 carbon atoms which may contain a heteroatom or an aryl group which may contain a heteroatom, and particularly preferably independently a methyl group, an ethyl group, an n-butyl group or an n-octyl group. Examples of the inorganic or organic group represented by $X^1$ include a halogen atom, a hydroxyl group, an alkoxyl group, an amino group, a carboxyl group, a sulfonic acid group, and a hydrogenation boron group, and any one of a bromine atom, a chlorine atom, and a iodine atom is preferred.

As the onium salt, tetra-n-butylammonium bromide is particularly preferred.

The trialkylaluminum used in the polymerization step of the second production method is not particularly limited as long as it is trialkylaluminum in which all of the alkyl groups contained are linear alkyl groups, and for example, trialkylaluminum represented by the general formula: $R^{12}R^{13}R^{14}Al$ may be mentioned.

Each $R^{12}$ to $R^{14}$ independently represents a linear alkyl group having 1 to 18 carbons, and Al represents an aluminum atom. Also, each $R^{12}$ to $R^{14}$ is preferably independently a linear alkyl group having 1 to 12 carbon atoms, and particularly preferably a linear alkyl group having 1 to 8 carbon atoms (i.e., a methyl group, an ethyl group, an n-propyl group, an n-butyl group, an n-pentyl group, an n-hexyl group, an n-heptyl group, or an no-octyl group). Moreover, it is particularly preferred that all $R^{12}$ to $R^{14}$ be the same group.

Examples of the trialkylaluminum include trimethylaluminum, triethylaluminum, and tri-n-octylaminium, and among them, trimethylaluminum and triethylaluminum are preferred.

In the polymerization step of the second production method, the use ratio of the onium salt and the trialkylaluminum is not particularly limited, but the molar ratio of the onium salt:trialkylaluminum is preferably in the range of 1:1 to 1:100, more preferably in the range of 1.0:1.1 to 1.0:50.0, and particularly preferably in the range of 1.0:1.2 to 1.0:10.0.

If necessary, other components such as a Lewis base such as N,N,N',N'-tetramethylethylenediamine and a crown ether may be added to a mixture of an onium salt and a trialkylaluminum, which is used as a catalyst.

Although there is no particular limitation on the method of mixing the onium salt with the trialkylaluminum, it is preferable to dissolve or suspend each of them in a solvent and mix them. Although there is no particular limitation on the solvent used, an inert solvent is suitably used, and for example, aromatic hydrocarbons such as benzene, and toluene; chain saturated hydrocarbons such as n-pentane, and n-hexane; alicyclic hydrocarbons such as cyclopentane, and cyclohexane; ethers such as tetrahydrofuran, anisole, and diethyl ether; or a mixed solvent thereof; and the like may be used. Although there is no particular limitation on the temperature and time at which the components constituting the catalyst are mixed, it is preferable to mix them under a condition of −30 to 50° C. for 10 seconds to 30 minutes.

In the polymerization step of the second production method, a microgel is formed by polymerizing or bonding a polyfunctional compound in the presence of the catalyst composed of an onium salt and a trialkylaluminum obtained as described above. The method of mixing the catalyst and the polyfunctional compound is not particularly limited, and for example, the polyfunctional compound may be added to a solvent containing the catalyst, or the catalyst may be added to a solvent containing the polyfunctional compound. The method of polymerizing or bonding is not particularly limited, but is preferably carried out in a solvent from the viewpoint of well controlling the reaction. As the solvent, an inert solvent is suitably used, for example, aromatic hydrocarbons such as benzene, and toluene; chain saturated hydrocarbons such as n-pentane, and n-hexane; alicyclic hydrocarbons such as cyclopentane, and cyclohexane; ethers such as tetrahydrofuran, anisole, and diethyl ether; or a mixed solvent thereof; and the like may be used. Among these solvents, non-polar solvents are particularly preferably used.

In the polymerization step of the second production method, when the polyfunctional compound is polymerized or bonded and thereby forming a microgel, a monomer containing an oxirane monomer containing at least an epihalohydrin such as epichlorohydrin, epibromohydrin, and epiiodohydrin is added to the microgel, and ring-opening polymerization of the monomer is performed.

In the second production method, the conditions under which the polymerization is performed are not particularly limited, and may be determined according to the type of the monomer or catalyst used, the target molecular weight, and the like. The polymerization can be carried out in a solution containing a microgel. The pressure at the time of polymerization is usually from 1 to 500 atm, preferably from 1 to 100 atm, and particularly preferably from 1 to 50 atm. The temperature at the time of polymerization is usually −70 to 200° C., preferably −40 to 150° C., and particularly preferably −20 to 100° C. The polymerization time is usually 10 seconds to 100 hours, preferably 20 seconds to 80 hours, and particularly preferably 30 seconds to 50 hours.

The monomer may be added in a total amount at one time to the reaction system, or may be added in multiple portions. In the second production method, since the polymerization reaction proceeds with living property, it is also possible to obtain a block copolymer by sequentially adding a different monomer and completing the polymerization reaction every time the monomer is added.

After completion of the polymerization reaction of all monomers, it is preferable to add a polymerization reaction terminator to the reaction system. As the polymerization reaction terminator, for example, water or alcohols can be used. By using such a polymerization reaction terminator, it is possible to obtain a multibranched base polymer composed of at least an epihalohydrin monomer unit having hydroxyl groups at all ends.

After the polymerization reaction is stopped, the base polymer may be recovered according to a conventional method such as drying under reduced pressure.

Onium-Forming Step in the First Production Method and the Second Production Method Both the first production method and the second production method include an onium-forming step. In the onium-forming step, at least a portion of the halogen atoms constituting the epihalohydrin monomer unit in the obtained base polymer is replaced with a cationic group using an onium-forming agent. The cationic group obtained in the onium-forming step is usually an onium halide group. As the onium-forming agent, a nitrogen atom-containing aromatic heterocyclic compound is preferred, for example, five membered heterocyclic compounds such as imidazole, 1-methylimidazole, pyrrole, 1-methylpyrrole, thiazole, oxazole, pyrazole, and isoxazole; six membered heterocyclic compounds such as pyridine, pyrazine, pyrimidine, pyridazine, triazine, 2,6-lutidine; fused heterocyclic compounds such as quinoline, isoquinoline, quinoxaline, quinazoline, cinnoline, purine, indole, isoindole, benzimidazole, benzoxazole, and benzisoxazole; and the like may be mentioned. Among these, five membered heterocyclic compound and six membered heterocyclic compound are preferred, and from the viewpoint of material stability after the reaction, 1-methylimidazole is more preferred.

A method of replacing at least a part of the halogen atoms constituting the epihalohydrin monomer unit in the base polymer with the cationic group is the method in which a known onium-forming reaction is applied, and the known onium-forming reaction is disclosed in JP-A-50-33271, JP-A-51-69434, and JP-A-52-42481, and the like.

Examples of a method of replacing at least a part of the halogen atoms constituting the epihalohydrin monomer unit in the base polymer with the cationic group include a method of replacing by mixing and reacting the above-described onium-forming agent with the base polymer containing an epihalohydrin monomer unit. The method of mixing the onium-forming agent and the base polymer is not particularly limited, and examples thereof include a method of mixing these through a solvent using a solvent, a method of mixing them substantially without mediating a solvent, and the like.

A method of mixing the base polymer containing an epihalohydrin monomer unit and the onium-forming agent using a solvent is not particularly limited, and examples thereof include a method of adding and mixing an onium-forming agent to a solution obtained by dissolving the base polymer in a solvent, a method of adding and mixing the base polymer to a solution obtained by dissolving the onium-forming agent in a solvent, a method of dissolving both the onium-forming agent and the base polymer in a solvent to prepare a solution, and mixing both solutions. The base polymer and the onium-forming agent may be dispersed in a solvent, and whether the base polymer or the onium-forming agent is dissolved in a solvent or dispersed may be used.

As the solvent, an inert solvent is suitably used, and may be non-polar or polar. Examples of non-polar solvent include, aromatic hydrocarbons such as benzene, and toluene; chain saturated hydrocarbons such as n-pentane, and n-hexane; alicyclic saturated hydrocarbons such as cyclopentane, and cyclohexane; and the like. Examples of polar solvent include, ethers such as tetrahydrofuran, anisole, and diethyl ether; esters such as ethyl acetate and ethyl benzoate; ketones such as acetone, 2-butanone, and acetophenone; aprotic polar solvents such as acetonitrile, dimethylformamide, and dimethyl sulfoxide; and protic polar solvents such as ethanol, methanol, and water. As the solvent, these mixed solvents are also suitably used. The amount of the solvent to be used is not particularly limited, but is preferably used so that the concentration of the base polymer containing the epihalohydrin monomer unit is 1 to 50% by weight, and more preferably 3 to 40% by weight.

The temperature at the time of the reaction when a solvent is used is preferably 20 to 170° C., and the reaction time is preferably 1 minute to 500 hours.

The amount of the onium-forming agent to be used is not particularly limited, but may be determined depending on the structure of the onium-forming agent or the base polymer used, the substitution ratio of the onium ion-containing group in the target base polymer, and the like. Specifically, the amount of the onium-forming agent to be used is usually in the range of 0.01 to 100 mol, preferably 0.02 to 50 mol, more preferably 0.03 to 10 mol, and still more preferably 0.05 to 2 mol, based on 1 mol of the halogen atom constituting the epihalohydrin monomer unit to be used. If the amount of the onium-forming agent is too small, the replacement reaction may be slow and a polyether compound having a cationic group of a desired composition may not be obtained, and on the other hand, if the amount of the onium-forming agent is too large, it may be difficult to remove the unreacted onium-forming agent from the obtained polyether compound.

Anion Exchange Step in the First Production Method and the Second Production Method The first production method and the second production method may further include, if necessary, an anion exchange step of exchanging a halide ion constituting the onium halide group into a desired anion.

Since the counter anion in the polyether compound obtained by the onium-forming step is an ionizing ionic bond, at least a part of the counter anion can be anion-exchanged into any counter anion by a known ion exchange reaction. In a stage in which the above onium-forming agent and the polyether compound containing an epihalohydrin monomer unit are mixed and the reaction is completed, X of the above general formula (1) is a halogen atom, but a known anion exchange reaction may be performed on a halide ion which is a counter anion of $A^+$. The anion exchange reaction can be carried out by mixing an ionic compound having an ionizing property with respect to the polyether compound having an onium ion-containing group. The condition under which the anion exchange reaction is performed is not particularly limited, but may be determined in accordance with the structures of the ionic compound and the polyether compound used, the targeted substitution rate of the counter anion of $A^+$, and the like. The reaction may be carried out only by the ionic compound and the polyether compound having an onium ion-containing group, or may contain other compounds such as an organic solvent. The amount of the ionic compound to be used is not particularly limited, but is usually in the range of 0.01 to 100 mol, preferably 0.02 to 50 mol, and more preferably 0.03 to 10 mol, based on 1 mol of the halogen atom constituting the epihalohydrin monomer unit. If the amount of the ionic compound is too small, the substitution reaction may be difficult to proceed, and on the other hand, if the amount is too large, remove of the ionic compound may be difficult.

The pressure during anion-exchange reaction is usually 0.1 to 50 MPa, preferably 0.1 to 10 MPa, and more preferably 0.1 to 5 MPa. The temperature at the time of the reaction is usually −30 to 200° C., preferably −15 to 180° C., and more preferably 0 to 150° C. The reaction time is usually 1 minute to 1000 hours, preferably 3 minutes to 100 hours, more preferably 5 minutes to 10 hours, and still more preferably 5 minutes to 3 hours.

The anion species of the counter anion is not particularly limited, for example, halide ions such as fluoride ion, chloride ion, bromide ion, and iodide ion; sulfate ion; sulfite ion; hydroxide ion; carbonate ion; bicarbonate ion; nitrate ion; acetate ion; perchlorate ion; phosphate ion; alkyloxy ion; trifluoromethanesulfonate ion; bistrofluoromethane-sulfonimide ion; hexafluorophosphate ion; tetrafluoroborate ion; acetate ion; dicyanamide ion; tetracyanoborate ion; and the like may be mentioned.

<Block Copolymer>

The polyether compound according to the present invention can be used as a structural unit in a block copolymer. In particular, a block copolymer (ABA type block polymer, ABABA type block polymer, or the like) having a block of a polyether compound and a block provided at both ends of the block of a polyether compound and constituting a hard segment can be suitably used for a gas separation membrane because a thin self-supporting film can be formed while sufficiently exhibiting gas separation performance of a polyether compound to be described later.

Examples of the block constituting the hard segment include blocks formed of polyurethane, polyester, polyimide, polyamide, polycarbonate, phenol resin, poly(meth) acrylate, polyurea, polyolefin, polystyrene, and the like.

The block copolymer can be produced by coupling the polyether compound and the polymer constituting the hard segment by utilizing a hydroxyl group or an azide group having the polyether compound at a polymer main chain end.

<Cross-Linkable Composition>

As the polyether compound, a compound having a cross-linkable group in addition to a cationic group may be used, and a cross-linking agent may be blended into the polyether compound and used. By cross-linking a cross-linkable composition containing the polyether compound having a cationic group and a cross-linkable group or the block copolymer and a cross-linking agent, a formed article excellent in mechanical strength can be obtained.

The cross-linking agent may be appropriately selected in accordance with the kind of the cross-linkable group of the polyether compound having a cationic group and the like. Specific examples of the cross-linking agent include: sulfur such as powdered sulfur, precipitated sulfur, colloidal sulfur, insoluble sulfur, and highly dispersible sulfur; sulfur-containing compounds, such as sulfur monochloride, sulfur dichloride, morpholine disulfide, alkylphenol disulfide, dibenzothiazyl disulfide, N,N'-dithio-bis(hexahydro-2H-azenopine-2), phosphorus-containing polysulfide, and polymer polysulfide; organic peroxides such as dicumyl peroxide and ditertiarybutyl peroxide; quinone dioxime such as p-quinonedioxime and p,p'-dibenzoylquinonedioxime; organic polyvalent amine compounds such as triethylenetetramine, hexamethylenediamine carbamate, and 4,4'-methylenebis-o-chloroaniline; triazine compounds such as s-triazine-2,4,6-trithiol; alkylphenol resins having a methylol group; various ultraviolet cross-linking agents such as alkylphenone type photopolymerization initiators like 2-methyl-1-(4-methylthiophenyl)-2-morpholinopropan-1-one and 2-(dimethylamino)-2-[(4-methylphenyl)methyl]-1-[4-(4-morpholinyl) phenyl]-1-butanone; and the like. For example, when the cross-linkable group of the polyether compound having a cationic group is an ethylenic carbon-carbon unsaturated bond-containing group, among the above cross-linking agents, it is preferable to use a cross-linking agent selected from sulfur, a sulfur-containing compound, an organic peroxide, and an ultraviolet cross-linking agent, and it is particularly preferable to use an ultraviolet cross-linking agent. These cross-linking agents can be used singly or in combination of two or more.

The blended amount of the cross-linking agent is not particularly limited, but is preferably 0.1 to 10 parts by weight, more preferably 0.2 to 7 parts by weight, and even more preferably 0.3 to 5 parts by weight, based on 100 parts by weight of the polyether compound having a cationic group. By setting the blending amount of the cross-linking agent to within the above range, a formed product having excellent mechanical strength can be obtained.

The method for cross-linking the cross-linkable composition of the present invention may be selected according to, for example, the type of cross-linking agent to be used. Examples of the method include, but are not particularly limited to, cross-linking by heating or cross-linking using ultraviolet ray irradiation. In the case of cross-linking by heating, the cross-linking temperature is not particularly limited, but is preferably 130 to 200° C., and more preferably 140 to 200° C. The cross-linking time is also not particularly limited, and it is selected, for example, in the range of 1 minute to 5 hours. The heating method may be appropriately selected from among methods such as press heating, oven heating, steam heating, hot air heating, microwave heating, and the like. In the case of performing cross-linking using ultraviolet ray irradiation, ultraviolet rays may be irradiated onto the cross-linkable composition by a usual method using a light source such as a high pressure mercury lamp, a metal halide lamp, and a mercury-xenon lamp.

<Formed Article>

By using the polyether compound according to the present invention, the block copolymer described above, or the cross-linkable composition described above, a formed article can be obtained. The formed article according to the present invention can be suitably used for a gas separation membrane, a separator of a secondary battery, and the like.

The method of forming is not particularly limited, a method of obtaining a formed article by forming the polyether compound, the block copolymer or the cross-linkable composition using a forming machine, a method of obtaining a film-shaped formed article by dissolving or dispersing the polyether compound, the block copolymer or the cross-linkable composition in a solvent to prepare a liquid composition, and then casting the obtained liquid composition onto a substrate, and a method of obtaining a formed article (impregnated porous body) by dissolving or dispersing the polyether compound, the block copolymer or the cross-linkable composition in a solvent to prepare a liquid composition, and then impregnating the obtained liquid composition with a porous body, and the like may be mentioned.

The forming method using a forming machine is not particularly limited, but may include an extrusion molding method, an injection molding method, a compression forming method, a calendar forming method, and the like.

In particular, when the block copolymer described above is used, since a self-supporting film can be easily produced, a method of obtaining a formed article by forming a block copolymer using a forming machine is preferred.

Further, an additive such as a reinforcing agent; an anti-aging agent; an ultraviolet absorber; a light-resistant stabilizer; a tackifier; a surfactant; a conductivity imparting agent; an electrolyte substance; a colorant (dye/pigment); a flame retardant; an antistatic agent; and the like may be blended into the polyether compound, the block copolymer or the cross-linkable composition, and then the mixture may be formed into a formed article.

<Gas Separation Membrane>

Since the polyether compound according to the present invention has gas separation performance, it can be suitably used for a gas separation membrane. Since the gas separation membrane according to the present invention contains the above-described polyether compound, it has excellent gas separation performance. In particular, a film formed from the block copolymer described above has excellent gas separation performance, and also has excellent mechanical strength, and can be used as a self-supporting film.

The gas separation membrane according to the present invention can be suitably utilized, for example, for separation of $CO_2$ from natural gas, separation of $CO_2$ from biogas, separation of $CO_2$ from $CO_2/CH_3$ containing gas, and separation of $CO_2$ from $CO_2/N_2$ containing gas. Gases to be separated may include hydrogen sulfide, mercaptan (thiol), disulfide, carbon disulfide, and the like. In particular, the gas separation membrane according to the present invention is suitable as a $CO_2$ separation membrane.

The gas separation membrane according to the present invention can be utilized as a self-supporting membrane alone, or can be utilized by laminating with a porous support.

EXAMPLES

Hereinafter, the present invention will be described specifically by way of Examples and Comparative Examples. In each example, the term "parts" is based on weight unless otherwise specified. The tests and the evaluations were carried out as follows.

[Number Average Molecular Weight (Mn) and Molecular Weight Distribution (Mw/Mn)]

The number average molecular weight (Mn) and the molecular weight distribution (Mw/Mn) were measured as polystyrene equivalent values by gel permeation chromatography (GPC) with tetrahydrofuran as a solvent. HLC-8320 (manufactured by Tosoh Corporation) was used as the measuring instrument, in which two columns of TSKgel SuperMultipore HZ-H (manufactured by Tosoh Corporation) were connected in series, and a differential refractometer RI-8320 and an ultraviolet-visible detector (UV-wavelength set to 254 nm) (manufactured by Tosoh Corporation) were used as the detector.

[Nuclear Magnetic Resonance Spectroscopy (NMR) Measurement]

First, 30 mg of the polyether compound serving as a sample was added to 1.0 mL of deuterated dimethyl sulfoxide and uniformly dissolved by shaking for 1 hours. Then, NMR-measurement was carried out on the obtained solution to obtain H-NMR spectra, and the structure of the polyether compound was assigned according to the usual method. JEOL JNM-EX400WB spectrometer (399.78 MHz for 1H, 100.53 MHz for 13C) or Bruker Avance III 500 MHz spectrometer (500.13 MHz for 1H, 125.77 MHz for 13C) was used as the NMR apparatus.

Production Example A (Living Anionic Polymerization of Epichlorohydrin)

To a glass reactor with a stirrer replaced with argon, 2.84 g of tetra-n-butylammonium azide and 50 ml of toluene were added, which was cooled to 0° C. Then, 1.256 g of triethylaluminum (1.1 equivalents based on tetra-n-butylammonium azide) dissolved in 10 ml of n-hexane was added and reacted for 15 minutes to obtain a catalyst composition. To the obtained catalyst composition, 15.0 g of epichlorohydrin was added, and a polymerization reaction was carried out at 0° C. After initiation of the polymerization reaction, the viscosity of the solution gradually increased. After the reaction for 12 hours, a small amount of water was poured into the polymerization reaction solution to stop the reaction. The obtained polymerization reaction solution was subjected to a demineralization process of the catalyst residue by washing with an aqueous hydrochloric acid solution of 0.1 N, and further washed with ion-exchanged water, and then the organic phase was dried under reduced pressure at 50° C. for 12 hours. The yield of the colorless and transparent oily material thus obtained was 14.9 g. Further, the number average molecular weight (Mn) of the obtained material by GPC by differential refractometer was 1,580, and the molecular weight distribution (Mw/Mn) was 1.21. The obtained material was not detected by an ultraviolet-visible detector of GPC. From the above, it can be said that the obtained oily material is an oligomer (average of 17-mer) (hereinafter, polyepichlorohydrin A) composed of an epichlorohydrin unit having an azide group at the polymerization initiation end and a hydroxyl group at the polymerization termination end.

Production Example B (Coupling of Azide Group of Polyepichlorohydrin a by Click Chemistry)

To a glass reactor with a stirrer replaced with argon, 1.5 g of polyepichlorohydrin A and 10 ml of dimethylformamide were added, which was held at room temperature. Then, 0.287 g of copper (I) bromide and 0.347 g of pentamethyldiethylenetriamine and 0.053 g of 1,7-octadiyne were added to the above solution and reacted at room temperature for 48 hours. The obtained polymerization reaction solution was extracted with toluene, and the organic phase was washed with ion-exchanged water to perform a demineralization process of the catalyst residue, and the organic phase was dried under reduced pressure at 50° C. for 12 hours. The yield of the colorless and transparent oily material thus obtained was 1.4 g. Further, the number average molecular weight (Mn) of the obtained material by GPC by differential refractometer was 2,800, and the molecular weight distribution (Mw/Mn) was 1.26. The resulting material was also detected in an ultraviolet-visible detector of GPC, suggesting the formation of a 1,2,3-triazole ring. It was confirmed by $^1$H-NMR that a triazole ring was introduced.

From the above, it can be said that the obtained oily material is telechelic polyepichlorohydrin B (average 30-mer according to GPC) having a hydroxyl group at both ends, in which the azide group at the end of polyepichlorohydrin A and the 1,7-octadiyne are coupled to each other to form a dimer of polyepichlorohydrin A.

Example 1

(Quaternation of Telechelic Polyepichlorohydrin B with 1-Methylimidazole)

1.0 g of telechelic polyepichlorohydrin B having a hydroxyl group at both ends obtained in Production Example B, 2.4 g of 1-methylimidazole, and 2.0 g of acetonitrile were added to a glass reactor with a stirrer substituted with argon and heated to 80° C. After 48 hours of reaction at 80° C., cooled to room temperature to stop the reaction. After washing the obtained reacted material with an equal weight mixed solution of toluene/methanol/water, the organic phase containing 1-methylimidazole and toluene was removed, and the aqueous phase was dried under reduced pressure at 50° C. for 12 hours to obtain 1.9 g of a pale red solid. When $^{1}$H-NMR and elemental analyses were carried out on this solid, it was identified as an imidazolium structure-containing telechelic polyether compound 1 having a chloride ion as a counter anion of an imidazolium cation, and two hydroxyl groups at both chain ends, in which all of the chloro groups in the repeating unit of telechelic polyepichlorohydrin B as the starting material was substituted with a 1-methylimidazolium group having a chloride ion as a counter anion.

Example 2

(Anion Exchange by Lithium (Bistrifluoromethylsulfone) Imide of Imidazolium Structure-Containing Telechelic Polyether Compound 1 with Chloride Ions as Counter Anion)

1.25 g of the imidazolium structure-containing telechelic polyether compound 1 having a hydroxyl group at both ends and a chloride ion as a counter anion, 2.1 g of lithium (bistrifluoromethylsulfone)imide, and 10 mL of ion-exchanged water were added to a glass reactor with a stirrer. After reacting at room temperature for 30 minutes, the mixture was dried under reduced pressure at 50° C. for 12 hours, and the obtained solid-liquid mixture was washed with water to remove inorganic salts, and then the liquid phase was extracted with toluene. When the obtained toluene solution was dried under reduced pressure at 50° C. for 12 hours, 2.8 g of an almost colorless transparent viscous liquid material was obtained. When $^{1}$H-NMR spectral measurement and elemental analysis were carried out on the obtained viscous liquid material, it was identified as an imidazolium structure-containing telechelic polyether compound 2 having a (bistrifluoromethylsulfone)imide anion as a counter anion of an imidazolium cation, and two hydroxyl groups at both chain ends, in which all of the chloride ions of the imidazolium structure-containing polyether compound having chloride ion as a counter anion as the starting material was exchanged into (bistrifluoromethylsulfone)imide anion.

Production Example C (Living Anionic Copolymerization of Epichlorohydrin and Allyl Glycidyl Ether)

To a glass reactor with a stirrer replaced with argon, 2.84 g of tetra-n-butylammonium azide and 50 ml of toluene were added, which was cooled to 0° C. Further, 1.370 g (1.2 eq) of triethylaluminum dissolved in 10 ml of n-hexane was added and reacted for 15 minutes. To the thus obtained mixture, 9.0 g of epichlorohydrin and 1.0 g of allyl glycidyl ether were added, and the polymerization reaction was carried out at 0° C. After initiation of the polymerization reaction, the viscosity of the solution gradually increased. After the reaction for 12 hours, a small amount of water was poured into the polymerization reaction solution to stop the reaction. Demineralization and washing process of the catalyst residue was performed using an aqueous hydrochloric acid solution of 0.1 N, and further, after washing with ion-exchanged water, the organic phase was dried under reduced pressure at 50° C. for 12 hours. The yield of the obtained colorless and transparent oily material was 9.9 g. Further, the number average molecular weight (Mn) of the obtained polymer (oily material) by GPC by differential refractometer was 1,050, and the molecular weight distribution (Mw/Mn) was 1.35. By $^{1}$H-NMR, the composition of the obtained polymer was calculated to be 91.7 mol % of the epichlorohydrin unit and 8.3 mol % of the allyl glycidyl ether unit, which corresponded with the composition ratio introduced into the polymerization reaction. The resulting oily material was not detected by an ultraviolet-visible detector of GPC. From the above, it can be said that the obtained oily material is a poly(epichlorohydrin-co-allyl glycidyl ether) (average 11-mer) (hereinafter, polyether C) having an azide group at the polymerization initiation end and a hydroxyl group at the polymerization termination end.

Production Example D (Coupling of Azide Group of Polyether C by Click Chemistry)

To a glass reactor with a stirrer substituted with argon, 1.0 g of polyether C and 10 ml of dimethylformamide were added, which was held at room temperature. Then, 0.287 g of copper (I) bromide and 0.347 g of pentamethyldiethylenetriamine and 0.053 g of 1,7-octadiyne were added to the above solution and reacted at room temperature for 48 hours. The obtained polymerization reaction solution was extracted with toluene, and the organic phase was washed with ion-exchanged water to perform a demineralization process of the catalyst residue, and the organic phase was dried under reduced pressure at 50° C. for 12 hours. The yield of the colorless and transparent oily material thus obtained was 1.0 g. Further, the number average molecular weight (Mn) of the obtained material by GPC by differential refractometer was 1,900, and the molecular weight distribution (Mw/Mn) was 1.19. The resulting material was also detected in an ultraviolet-visible detector of GPC, suggesting the formation of a 1,2,3-triazole ring. It was confirmed by $^{1}$H-NMR that a triazole ring was introduced.

From the above, it can be said that the obtained oily material is a telechelic polyether D (average 21-mer according to GPC) having a hydroxyl group at both ends, in which an azide group at the end of polyether C and a 1,7-octadiyne are coupled to each other to form a dimer of polyether C.

Example 3

(Quaternation of Telechelic Polyether D with 1-Methylimidazole)

1.0 g of telechelic polyether D having a hydroxyl group at both ends obtained in Production Example D, 2.4 g of 1-methylimidazole, and 2.0 g of acetonitrile were added to a glass reactor with a stirrer substituted with argon and heated to 80° C. After 48 hours of reaction at 80° C., cooled to room temperature to stop the reaction. After washing the obtained reacted material with an equal weight mixed solution of toluene/methanol/water, the organic phase containing 1-methylimidazole and toluene was removed, and the aqueous phase was dried under reduced pressure at 50° C. for 12 hours to obtain 1.9 g of a pale red solid. When $^{1}$H-NMR and elemental analyses were carried out on this solid, it was identified as an imidazolium structure-containing telechelic polyether compound 3 having a chloride ion as a counter anion of an imidazolium cation, and two hydroxyl groups at both chain ends, in which all of the chloro groups in the repeating unit of telechelic polyether D as the starting material was substituted with a 1-methylimidazolium group having a chloride ion as a counter anion.

Example 4

(Anion Exchange by Lithium (Bistrifluoromethylsulfone) Imide of Imidazolium Structure-Containing Telechelic Polyether Compound 3 with Chloride Ions as Counter Anion)

1.25 g of the imidazolium structure-containing telechelic polyether compound 3 having a hydroxyl group at both ends and a chloride ion as a counter anion, 2.1 g of lithium (bistrifluoromethylsulfone)imide, and 10 mL of ion-exchanged water were added to a glass reactor with a stirrer. After reacting at room temperature for 30 minutes, the mixture was dried under reduced pressure at 50° C. for 12 hours, and the obtained solid-liquid mixture was washed with water to remove inorganic salts, and then the liquid phase was extracted with toluene. When the obtained toluene solution was dried under reduced pressure at 50° C. for 12 hours, 2.8 g of an almost colorless transparent viscous liquid material was obtained. When $^{1}$H-NMR spectral measurement and elemental analysis were carried out on the obtained viscous liquid material, it was identified as an imidazolium structure-containing telechelic polyether compound 4 having a (bistrifluoromethylsulfone)imide anion as a counter anion of an imidazolium cation, and two hydroxyl groups at both chain ends, in which all of the chloride ions of the imidazolium structure-containing polyether compound having chloride ion as a counter anion as the starting material was exchanged into (bistrifluoromethylsulfone)imide anion.

Production Example E (Living Anionic Copolymerization of Epichlorohydrin)

To a glass reactor with a stirrer replaced with argon, 0.284 g of tetra-n-butylammonium azide and 50 ml of toluene were added, which was cooled to 0° C. Further, 0.143 g of triethylaluminum (1.25 equivalents based on tetra-n-butylanonium azide) dissolved in 2 ml of n-hexane was added and reacted for 15 minutes to obtain a catalyst composition. To the obtained catalyst composition, 15.0 g of epichlorohydrin was added, and a polymerization reaction was carried out at 0° C. After initiation of the polymerization reaction, the viscosity of the solution gradually increased. After the reaction for 12 hours, a small amount of water was poured into the polymerization reaction solution to stop the reaction. The obtained polymerization reaction solution was subjected to a demineralization process of the catalyst residue by washing with an aqueous hydrochloric acid solution of 0.1 N, and further washed with ion-exchanged water, and then the organic phase was dried under reduced pressure at 50° C. for 12 hours. The yield of the colorless and transparent oily material thus obtained was 14.8 g. Further, the number average molecular weight (Mn) of the obtained material by GPC by differential refractometer was 13,900, and the molecular weight distribution (Mw/Mn) was 1.33. The obtained material was not detected by an ultraviolet-visible detector of GPC. From the above, it can be said that the obtained oily material is polyepichlorohydrin (average 150-mer) (hereinafter, polyepichlorohydrin E) having an azide group at the polymerization initiation end and a hydroxyl group at the polymerization termination end.

Production Example F (Coupling by $Me_2SiCl_2$ of Polyepichlorohydrin E)

To a glass reactor with a stirrer replaced with argon, 1.5 g of polyepichlorohydrin E and 10 ml of toluene were added, which was held at room temperature. A solution of 0.000697 g of $Me_2SiCl_2$ dissolved in 1 ml of toluene was then added to the above solution and reacted at room temperature for 48 hours. The obtained polymerization reaction solution was extracted with toluene, and the organic phase was washed with ion-exchanged water to perform a demineralization process of the catalyst residue, and the organic phase was dried under reduced pressure at 50° C. for 12 hours. The yield of the colorless and transparent oily material thus obtained was 1.4 g. Further, the number average molecular weight (Mn) of the obtained material by GPC by differential refractometer was 26, 600, and the molecular weight distribution (Mw/Mn) was 1.43. The obtained material was not detected by an ultraviolet-visible detector of GPC. From the above, it can be said that the obtained oily material is telechelic polyepichlorohydrin F (average 288-mer according to GPC) having an azide group at both ends, in which the hydroxyl group at the end of polyepichlorohydrin E and $Me_2SiCl_2$ are coupled to each other to form a dimer of polyepichlorohydrin E.

Example 5

(Quaternation of Telechelic Polyepichlorohydrin F with 1-Methylimidazole)

1.0 g of telechelic polyepichlorohydrin F having an azide group at both ends obtained in Production Example F, 2.4 g of 1-methylimidazole, and 2.0 g of acetonitrile were added to a glass reactor with a stirrer substituted with argon and heated to 80° C. After 48 hours of reaction at 80° C., cooled to room temperature to stop the reaction. After washing the obtained reacted material with an equal weight mixed solution of toluene/methanol/water, the organic phase containing 1-methylimidazole and toluene was removed, and the aqueous phase was dried under reduced pressure at 50° C. for 12 hours to obtain 1.9 g of a pale red solid. When $^{1}$H-NMR and elemental analyses were carried out on this solid, it was identified as an imidazolium structure-containing telechelic polyether compound 5 having a chloride ion as a counter anion of an imidazolium cation, and two azide groups at both chain ends, in which all of the chloro groups in the repeating unit of telechelic polyepichlorohydrin F as the starting material was substituted with a 1-methylimidazolium group having a chloride ion as a counter anion.

Example 6

(Anion Exchange by Lithium (Bistrifluoromethylsulfone) Imide of Imidazolium Structure-Containing Telechelic Polyether Compound 5 with Chloride Ions as Counter Anion)

1.25 g of the imidazolium structure-containing telechelic polyether compound 5 having an azide group at both ends and a chloride ion as a counter anion, 2.1 g of lithium (bistrifluoromethylsulfone)imide, and 10 mL of ion-exchanged water were added to a glass reactor with a stirrer. After reacting at room temperature for 30 minutes, the mixture was dried under reduced pressure at 50° C. for 12 hours, and the obtained solid-liquid mixture was washed with water to remove inorganic salts, and then the liquid phase was extracted with toluene. When the obtained toluene solution was dried under reduced pressure at 50° C. for 12 hours, 2.8 g of an almost colorless transparent viscous liquid material was obtained. When $^{1}$H-NMR spectral measurement and elemental analysis were carried out on the obtained viscous liquid material, it was identified as an imidazolium structure-containing telechelic polyether compound 6 having a (bistrifluoromethylsulfone)imide anion as a counter anion of an imidazolium cation, and two azide groups at both chain ends, in which all of the chloride ions of the imidazolium structure-containing polyether compound having chloride ion as a counter anion as the starting material was exchanged into (bistrifluoromethylsulfone)imide anion.

Production Example G (Living Anionic Polymerization of 1,2,7,8-Diepoxyoctane and Epichlorohydrin)

To a glass reactor with a stirrer replaced with argon, 0.161 g (0.0005 mol) of tetra-n-butylammonium bromide and 10 ml of toluene were added, which was cooled to 0° C. Then, 0.0857 g of triethylaluminum (1.5 equivalents based on tetra-n-butylammonium bromide) dissolved in 2 ml of n-hexane was added and reacted for 15 minutes to obtain a catalyst composition. To the obtained catalyst composition, 0.0711 g of 1,2,7,8-diepoxyoctane was added, and a polymerization reaction was carried out at 0° C. After initiation of the polymerization reaction, the viscosity of the solution gradually increased. After 100 minutes, 2.5 g of epichlorohydrin was further added, and the polymerization reaction was further carried out at ° C. After initiation of the polymerization reaction, the viscosity of the solution gradually increased. After the reaction for 12 hours, a small amount of water was poured into the polymerization reaction solution to stop the reaction. The obtained polymerization reaction solution was subjected to a demineralization process of the catalyst residue by washing with an aqueous hydrochloric acid solution of 0.1 N, and further washed with ion-exchanged water, and then the organic phase was dried under reduced pressure at 50° C. for 12 hours. The yield of the colorless and transparent oily material thus obtained was 2.56 g. Further, the number average molecular weight (Mn) of the obtained material by GPC by differential refractometer was 11,800, and the molecular weight distribution (Mw/Mn) was 1.92. The obtained material was not detected by an ultraviolet-visible detector of GPC. To 0.0005 mol of tetra-n-butylammonium bromide, 2.5 g of polymer is obtained, and the theoretical number average molecular weight per 1 molecules of initiator is 5,000. 11,800/5000=2.4 and on average a polyepichlorohydrin consisting of 2.4 chains has been obtained, that is, the resulting polyepichlorohydrin has a hydroxyl group at all ends and on average 2.4 hydroxyl groups per one molecular chain. From the above, it can be said that the obtained oily material is telechelic polyepichlorohydrin (average 128-mer) (hereinafter, telechelic polyepichlorohydrin G) having a hydroxyl group at all of the polymerization termination ends.

Example 7

(Quaternation of Telechelic Polyether G with 1-Methylimidazole)

1.0 g of telechelic polyether G having a hydroxyl group at all of the polymerization termination ends obtained in Production Example G, 2.4 g of 1-methylimidazole, and 2.0 g of acetonitrile were added to a glass reactor with a stirrer substituted with argon and heated to 80° C. After 48 hours of reaction at 80° C., cooled to room temperature to stop the reaction. After washing the obtained reacted material with an equal weight mixed solution of toluene/methanol/water, the organic phase containing 1-methylimidazole and toluene was removed, and the aqueous phase was dried under reduced pressure at 50° C. for 12 hours to obtain 1.9 g of a pale red solid. When $^1$H-NMR and elemental analyses were carried out on this solid, it was identified as an imidazolium structure-containing telechelic polyether compound 7 having a chloride ion as a counter anion of an imidazolium cation, and hydroxyl groups at all of the polymerization termination ends, in which all of the chloro groups in the repeating unit of telechelic polyether G as the starting material was substituted with a 1-methylimidazolium group having a chloride ion as a counter anion.

Example 8

(Anion Exchange by Lithium (Bistrifluoromethylsulfone) Imide of Imidazolium Structure-Containing Telechelic Polyether Compound 7 with a Hydroxyl Group at all Ends and Chloride Ions as Counter Anion)

1.25 g of the imidazolium structure-containing telechelic polyether compound 7 having a hydroxyl group at all ends and a chloride ion as a counter anion, 2.1 g of lithium (bistrifluoromethylsulfone)imide, and 10 mL of ion-exchanged water were added to a glass reactor with a stirrer. After reacting at room temperature for 30 minutes, the mixture was dried under reduced pressure at 50° C. for 12 hours, and the obtained solid-liquid mixture was washed with water to remove inorganic salts, and then the liquid phase was extracted with toluene. When the obtained toluene solution was dried under reduced pressure at 50° C. for 12 hours, 2.8 g of an almost colorless transparent viscous liquid material was obtained. When $^1$H-NMR spectral measurement and elemental analysis were carried out on the obtained viscous liquid material, it was identified as an imidazolium structure-containing telechelic polyether compound 8 having a (bistrifluoromethylsulfone)imide anion as a counter anion of an imidazolium cation, and hydroxyl groups at all of the polymerization termination ends, in which all of the chloride ions of the imidazolium structure-containing polyether compound having chloride ion as a counter anion as the starting material was exchanged into (bistrifluoromethylsulfone)imide anion.

Example 9

(Quaternation of Polyepichlorohydrin a with 1-Methylimidazole)

1.0 g of polyepichlorohydrin A having an azide group at the polymerization initiation end and a hydroxyl group at the polymerization termination end obtained in Production Example A, 2.4 g of 1-methylimidazole, and 2.0 g of acetonitrile were added to a glass reactor with a stirrer substituted with argon and heated to 80° C. After 48 hours of reaction at 80° C., cooled to room temperature to stop the reaction. After washing the obtained reacted material with an equal weight mixed solution of toluene/methanol/water, the organic phase containing 1-methylimidazole and toluene was removed, and the aqueous phase was dried under reduced pressure at 50° C. for 12 hours to obtain 1.9 g of a pale red solid. When $^1$H-NMR and elemental analyses were carried out on this solid, it was identified as an imidazolium structure-containing telechelic polyether compound 9 having a chloride ion as a counter anion of an imidazolium cation, an azide group at the polymerization initiation end, and a hydroxyl group at the polymerization termination end, in which all of the chloro groups in the repeating unit of polyepichlorohydrin A as the starting material was substituted with a 1-methylimidazolium group having a chloride ion as a counter anion.

Example 10

(Anion Exchange by Lithium (Bistrifluoromethylsulfone) Imide of Imidazolium Structure-Containing Telechelic Polyether Compound 9 with Chloride Ions as Counter Anion)

1.25 g of the imidazolium structure-containing telechelic polyether compound 9 having an azide group at the polymerization initiation end, a hydroxyl group at the polymerization termination end and a chloride ion as a counter anion, 2.1 g of lithium (bistrifluoromethylsulfone)imide, and 10 mL of ion-exchanged water were added to a glass reactor with a stirrer. After reacting at room temperature for 30 minutes, the mixture was dried under reduced pressure at 50° C. for 12 hours, and the obtained solid-liquid mixture was washed with water to remove inorganic salts, and then the liquid phase was extracted with toluene. When the obtained toluene solution was dried under reduced pressure at 50° C. for 12 hours, 2.8 g of an almost colorless transparent viscous liquid material was obtained. When $^1$H-NMR spectral measurement and elemental analysis were carried out on the obtained viscous liquid material, it was identified as an imidazolium structure-containing telechelic polyether compound 10 having a (bistrifluoromethylsulfone)imide anion as a counter anion of an imidazolium cation, an azide group at the polymerization initiation end, and a hydroxyl group at the polymerization termination end, in which all of the chloride ions of the imidazolium structure-containing polyether compound having chloride ion as a counter anion as the starting material was exchanged into (bistrifluoromethylsulfone)imide anion.

Example 11

(Quaternation of Polyepichlorohydrin a with 1-n-Butylimidazole)

1.0 g of polyepichlorohydrin A having an azide group at the polymerization initiation end and a hydroxyl group at the polymerization termination end obtained in Production Example A, 3.6 g of 1-n-butylimidazole, and 3.0 g of acetonitrile were added to a glass reactor with a stirrer substituted with argon and heated to 80° C. After 48 hours of reaction at 80° C., cooled to room temperature to stop the reaction. The obtained reacted material was distilled off under reduced pressure for 24 hours at 60° C., and then dissolved in methanol to perform reprecipitation in an acetone/tetrahydrofuran isogravimetric mixed solvent. The resulting oily solid was dried under reduced pressure at 80° C. for 12 hours to give 2.3 g of a pale red solid. When $^1$H-NMR and elemental analyses were carried out on this solid, it was identified as a butylimidazolium structure-containing telechelic polyether compound 11 having a chloride ion as a counter anion of an imidazolium cation, an azide group at the polymerization initiation end, and a hydroxyl group at the polymerization termination end, in which all of the chloro groups in the repeating unit of polyepichlorohydrin A as the starting material was substituted with a 1-n-butylimidazole group having a chloride ion as a counter anion.

Example 12

(Anion Exchange by Sodium Tetrafluoroborate of Butylimidazolium Structure-Containing Telechelic Polyether Compound 11 with Chloride Ions as Counter Anion)

2.2 g of the butylimidazolium structure-containing telechelic polyether compound 11 having an azide group at the polymerization initiation end, a hydroxyl group at the polymerization termination end and a chloride ion as a counter anion, 1.2 g of sodium tetrafluoroborate, 10 mL of ion-exchanged water, and 5 mL of methanol were added to a glass reactor with a stirrer. After reaction at room temperature for 30 minutes, the supernatant was removed, and two times of washing with 10 mL of ion-exchanged water were carried out. The resulting solution was reprecipitated with 2-propanol to give 3.1 g of an almost colorless transparent solid. When $^1$H-NMR spectral measurement and elemental analysis were carried out on the obtained solid, it was identified as a butylimidazolium structure-containing telechelic polyether compound 12 having a tetrafluoroborate anion as a counter anion of an imidazolium cation, an azide group at the polymerization initiation end, and a hydroxyl group at the polymerization termination end, in which all of the chloride ions of the butylimidazolium structure-containing polyether compound having chloride ion as a counter anion as the starting material was exchanged into tetrafluoroborate anion.

The invention claiemd is:

1. A polyether compound having a cationic group and two or more chain end groups, wherein all of the chain end groups are any of a hydroxyl group and an azide group, the polyether compound contains a linking group derived from a polyfunctional compound in the polymer main chain, and a functional group of the polyfunctional compound is at least one group selected from a group consisting of an alkynyl group, an isocyanate group and a halogenosilyl group.

2. A gas separation membrane comprising the polyether compound according to claim 1.

3. The polyether compound according to claim 1, wherein all of the chain end groups are hydroxyl groups.

4. The polyether compound according to claim 1, wherein all of the chain end groups are azide groups.

5. A polyether compound according to claim 1 composed of a monomer unit represented by the following general formula

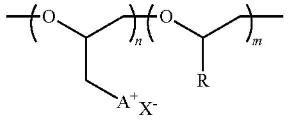

(1)

(1):

wherein, in the above formula (1), A+ represents a cationic group or a cationic group-containing group, X" represents any counter anion, R represents a non-ionic group, "n" is an integer of 1 or more, and "m" is an integer of 0 or more.

* * * * *